US008031614B2

(12) United States Patent
Archer et al.

(10) Patent No.: US 8,031,614 B2
(45) Date of Patent: Oct. 4, 2011

(54) METHOD AND APPARATUS FOR ROUTING DATA IN AN INTER-NODAL COMMUNICATIONS LATTICE OF A MASSIVELY PARALLEL COMPUTER SYSTEM BY DYNAMIC GLOBAL MAPPING OF CONTENDED LINKS

(75) Inventors: Charles Jens Archer, Rochester, MN (US); Roy Glenn Musselman, Rochester, MN (US); Amanda Peters, Rochester, MN (US); Kurt Walter Pinnow, Rochester, MN (US); Brent Allen Swartz, Chippewa Falls, WI (US); Brian Paul Wallenfelt, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/539,248

(22) Filed: Oct. 6, 2006

(65) Prior Publication Data

US 2008/0084827 A1 Apr. 10, 2008

(51) Int. Cl.
*G01R 31/08* (2006.01)
(52) U.S. Cl. ........ 370/238; 370/390; 370/235; 370/230; 709/213; 709/227; 709/245
(58) Field of Classification Search .................. 370/238, 370/236, 236.1, 392, 393, 390, 235, 230; 709/213, 227, 245
See application file for complete search history.

(56) References Cited

U.S. PATENT DOCUMENTS

| 5,050,162 | A | 9/1991 | Golestani |
| 5,218,676 | A | 6/1993 | Ben-Ayed et al. |
| 5,319,638 | A | 6/1994 | Lin |
| 5,347,450 | A | 9/1994 | Nugent |
| 5,453,978 | A | 9/1995 | Sethu et al. |
| 5,835,482 | A | 11/1998 | Allen |
| 5,933,425 | A * | 8/1999 | Iwata ............................. 370/351 |
| 5,959,995 | A | 9/1999 | Wicki et al. |
| 5,995,503 | A * | 11/1999 | Crawley et al. ............... 370/351 |
| 6,081,506 | A * | 6/2000 | Buyukkoc et al. ............ 370/235 |
| 6,486,983 | B1 | 11/2002 | Beshai et al. |
| 6,748,413 | B1 | 6/2004 | Bournas |
| 6,901,052 | B2 | 5/2005 | Buskirk et al. |
| 7,319,695 | B1 | 1/2008 | Agarwal et al. |
| 2004/0001508 | A1 | 1/2004 | Zheng et al. |
| 2005/0002334 | A1 | 1/2005 | Chao et al. |
| 2005/0018682 | A1 | 1/2005 | Ferguson et al. |

(Continued)

OTHER PUBLICATIONS

Ribler, Randy L et al, "The Autopilot performance-directed adaptive control system", Future Generations Computer Systems, Elsevier Science Publishers, Amsterdam, NL, vol. 18, No. 1, Sep. 1, 2001, pp. 175-187.

(Continued)

*Primary Examiner* — Huy Vu
*Assistant Examiner* — Kibrom T Hailu
(74) *Attorney, Agent, or Firm* — Roy W. Truelson

(57) ABSTRACT

A massively parallel nodal computer system periodically collects and broadcasts usage data for an internal communications network. A node sending data over the network makes a global routing determination using the network usage data. Preferably, network usage data comprises an N-bit usage value for each output buffer associated with a network link. An optimum routing is determined by summing the N-bit values associated with each link through which a data packet must pass, and comparing the sums associated with different possible routes.

23 Claims, 8 Drawing Sheets

U.S. PATENT DOCUMENTS

| | | |
|---|---|---|
| 2005/0068946 A1 | 3/2005 | Beshai |
| 2005/0100035 A1 | 5/2005 | Chiou et al. |
| 2005/0108425 A1 | 5/2005 | Rabinovitch |
| 2006/0002424 A1 | 1/2006 | Gadde |
| 2006/0195336 A1* | 8/2006 | Greven et al. .................. 705/1 |
| 2008/0016249 A1 | 1/2008 | Ellis et al. |

OTHER PUBLICATIONS

Zhang, Yan et al, "Automatic Performance Tuning for J2EE Application Server Systems", Lecture Notes in Computer Science, vol. 3806, 2005, pp. 520-527.

Chung, I-Hsin et al, "Automated cluster-based web service performance tuning", High Performance Distributed Computing, 2004, Proceedings of the 13th IEEE International Symposium on Honolulu, HI, USA, Jun. 4-6, 2004, Piscataway, NJ, USA, IEEE, Jun. 4, 2004, pp. 36-44.

Hondroudakis, Anna et al, "An Empirically Derived Framework for Classifying Parallel Program Performance Tuning Problems", Proceedings of the Sigmetrics Symposium on Parallel and Distributed Tools, SPDT 1998, Welches, OR, Aug. 3-4, 1998, Sigmetrics Symposium on Parallel and Distributed Tools, New York, NY, US, ACM, vol. SYMP.2, Aug. 3, 1998, pp. 112-123.

A. Gara et al., "Overview of the Blue Gene/L System Architecture" (IBM Journal of Research & Development, vol. 49, Nos. 2/3, Mar./May 2005, pp. 195-211).

N.R. Adiga et al, "Blue Gene/L Torus Interconnection Network" (IBM Journal of Research & Development, vol. 49, Nos. 2/3, Mar./May 2005, pp. 265-276).

M. Barnett et al., "Broadcasting on Meshes with Worm-Hole Routing" (Second Revised Version, 1995).

* cited by examiner

METHOD AND APPARATUS FOR ROUTING DATA IN AN INTER-NODAL COMMUNICATIONS LATTICE OF A MASSIVELY PARALLEL COMPUTER SYSTEM BY DYNAMIC GLOBAL MAPPING OF CONTENDED LINKS

STATEMENT REGARDING FEDERALLY SPONSORED RESEARCH OR DEVELOPMENT

This invention was made with Government support under Contract No. B519700 awarded by the Department of Energy. The Government has certain rights in this invention.

CROSS REFERENCE TO RELATED APPLICATIONS

The present application is related to the following commonly assigned copending U.S. patent applications, filed on the same date as the present application, all of which are herein incorporated by reference:

U.S. patent application Ser. No. 11/539,270, filed Oct. 6, 2006, entitled "Method and Apparatus for Routing Data in an Inter-Nodal Communications Lattice of a Massively Parallel Computer System by Semi-Randomly Varying Routing Policies for Different Packets";

U.S. patent application Ser. No. 11/539,300, filed Oct. 6, 2006, entitled "Method and Apparatus for Routing Data in an Inter-Nodal Communications Lattice of a Massively Parallel Computer System by Routing Through Transporter Nodes"; and U.S. patent application Ser. No. 11/539,329, filed Oct. 6, 2006, entitled "Method and Apparatus for Routing Data in an Inter-Nodal Communications Lattice of a Massively Parallel Computer System by Dynamically Adjusting Local Routing Strategies".

FIELD OF THE INVENTION

The present invention relates to digital data processing, and in particular to the operation of massively parallel computer systems comprising multiple nodes arranged in a regular matrix.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure for inter-nodal communication. The inter-nodal communications lattice allows different sub-processes of an application executing in parallel on different nodes to exchange data with one another. Typically, such a system further contains a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing parallel, computationally intensive applications, i.e., applications in which the proportion of computational processing and communication among parallel processes relative to I/O processing and I/O data transfer is relatively high. In such an application environment, most of the data entering and leaving a node is being communicated to other nodes as part of the application being processed in parallel. Therefore, it is important that the inter-nodal communications mechanism be designed to accommodate a large volume of data. Such an inter-nodal communications mechanism should support communication between any arbitrary pair of nodes (to avoid placing limitations on the types of applications which can be executed), but need not support communications between all possible node pairs with equal efficiency or latency. An internodal data communications lattice provides a set of node-to-node communications links arranged in a regular pattern likely to be useful for processing large processing applications in parallel, without providing a direct connection between any two arbitrary nodes. Data can be sent via this lattice between any arbitrary pair of nodes either directly (where such a direct connection exists) or by passing through one or more intermediate nodes.

An exemplary massively parallel nodal system is the IBM Blue Gene™ system. The IBM Blue Gene system contains many processing nodes, each having multiple processors and a common local (nodal) memory. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one ore more blocks of nodes, herein referred to as communicator sets, for performing specific sub-tasks during execution. The application may have an arbitrary number of such communicator sets, which may be created or dissolved at multiple points during application execution.

Where it is necessary to route data through one or more intermediate nodes of the inter-nodal communications lattice, there are generally multiple possible routes, and some methodology will be used to determine the routing. For ease of implementation and low management overhead, it is generally desirable to make routing decisions locally within the nodes, i.e., each node in a path determines an immediate destination node of the next hop along the network to be taken by a data packet. Unfortunately, such local routing determinations can often result in less than optimal network utilization. Many applications have patterns of data flow which, when routed locally without considering global network traffic, cause some links to bear disproportionately large volumes of traffic.

Improper routing of messages and distribution of network traffic in a massively parallel system can significantly affect the overall performance of the system. Large applications executing in such systems often require substantial inter-nodal communication of data. Network bottlenecks increase latency times for data to be exchanged, and may cause sub-processes executing in individual nodes to wait for data from other nodes, further affecting performance.

A need exists for improved tools or methods for routing data in an inter-nodal communications network of a massively parallel system.

SUMMARY OF THE INVENTION

A massively parallel computer system periodically collects usage data for an internal communications network, and broadcasts network usage data to all the nodes of the network. When a node sends data over the network, the node makes a global routing determination to the ultimate destination node based on the network usage data. Such a global determination has the capability to by-pass certain local hot spots of network activity, which might not be avoided using purely local routing decisions.

In the preferred embodiment, the computer system contains a separate inter-nodal communications network for supporting certain reduction operations among all nodes and for broadcasting data to all nodes. A process network, which is generally intended for supporting node-to-node communication of data generated from executing different parts of an application in different nodes (although it may be used for other purposes), is called the "torus network". The separate network for reduction and broadcast is referred to as the "collective network". The collective network forms a binary tree structure, in which reduction operations proceed up the tree to the root, and broadcasts are performed down the tree to the leaves. Torus network usage data from each node is periodically gathered up the collective network tree to form a global map of the status of the torus network at the root node of the tree. This global map is then broadcast down the collective network tree to all nodes.

In the preferred embodiment, each node contains a separate output buffer for each of the point-to-point links of the torus network. The network usage data taken at each node comprises an N-bit value for each such output buffer, indicating the degree to which the buffer is full. In a simple embodiment, N is 1, the bit being set if the number of packets waiting in the buffer exceeds some threshold, although N could be more than 1 to achieve greater granularity. A simple optimum routing is determined by summing the N-bit values associated with each link through which a data packet must pass, and comparing the sums associated with multiple different possible routes; a lower total value indicates a less congested, and therefore better, route.

The collection of network usage data and making of global routing decisions based thereon, as described herein, can be used in conjunction with any or all of various alternative or additional techniques for improving network efficiency, several of which are described herein.

By propagating network usage data to all nodes and making global routing decisions in the source node, a generally better routing can be achieved. Purely local routing decisions can only see the traffic on an immediate link, and therefore may fail to anticipate congested areas further ahead in a routing path. A global routing determination has the capability to choose what appears to be a less than optimum immediate link if it will by-pass a congested area further down the chain of links to be traversed. In this manner, a global routing decision in accordance with the present invention can avoid certain local hot spots of network activity, which might not be avoided using purely local routing decisions.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
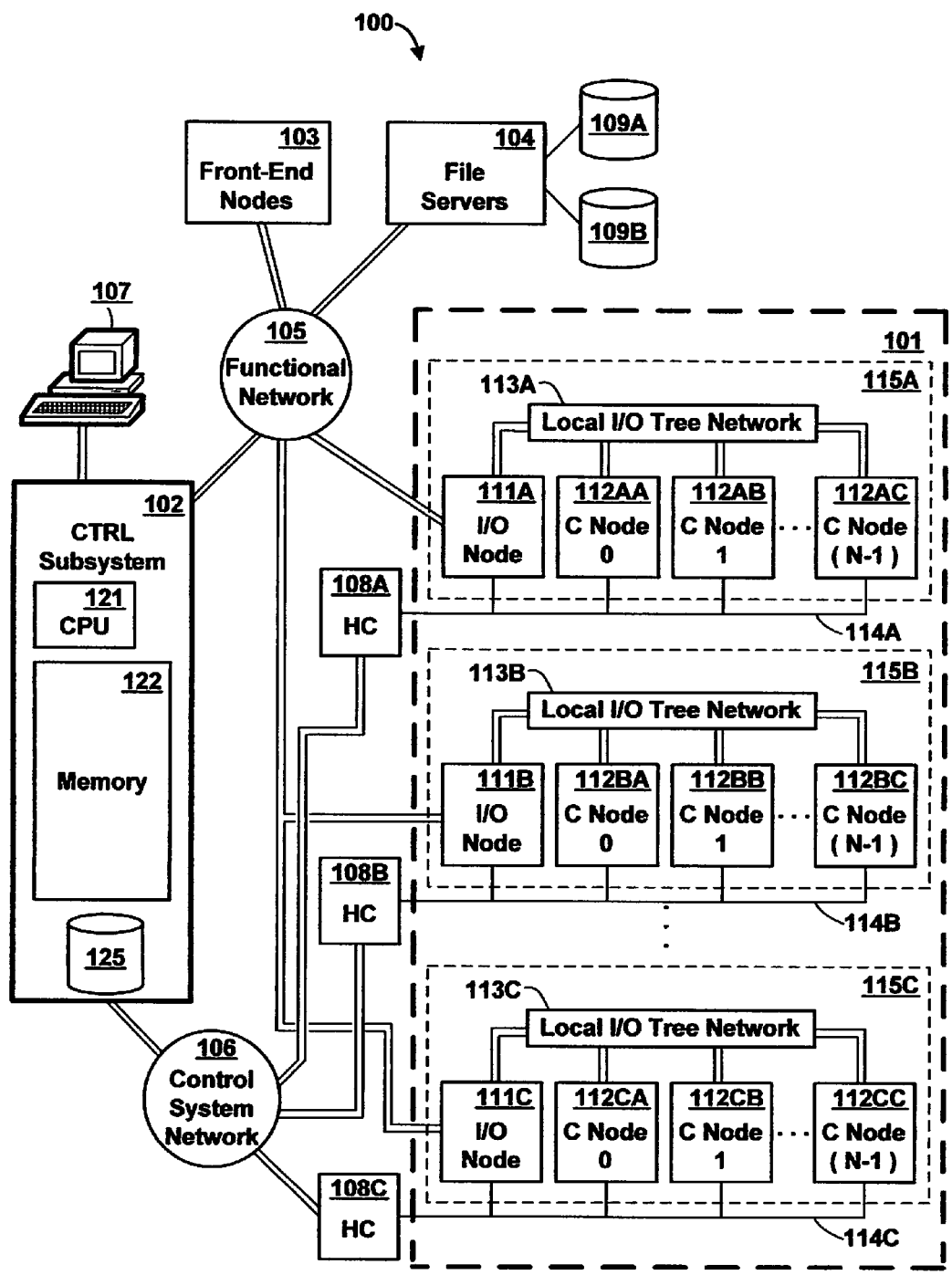
FIG. 1 is a high-level block diagram of the major components of a massively parallel computer system, in accordance with the preferred embodiment of the present invention.

Referring to the Drawing, wherein like numbers denote like parts throughout the several views, FIG. 1 is a high-level block diagram of the major hardware components of a massively parallel computer system 100 in accordance with the preferred embodiment of the present invention. In the preferred embodiment, computer system 100 is an IBM Blue Gene™ computer system, it being understood that other computer systems could be used, and the description of a preferred embodiment herein is not intended to limit the present invention to the particular architecture described. Additional background information concerning the architecture of an IBM Blue Gene™ computer system can be found in the following commonly owned, copending U.S. patent applications and PCT application designating the United States, each of which are herein incorporated by reference:

U.S. patent application Ser. No. 10/468,991, filed Feb. 25, 2002, entitled "Arithmetic Functions in Torus and Tree Network";

U.S. patent application Ser. No. 10/469,000, filed Feb. 25, 2002, entitled "Global Tree Network for Computing Structure";

U.S. patent application Ser. No. 10/468,993, filed Feb. 25, 2002, entitled "Novel Massively Parallel Supercomputer";

U.S. patent application Ser. No. 10/468,996, filed Feb. 25, 2002, entitled "Fault Isolation Through No-Overhead Link Level CRC";

U.S. patent application Ser. No. 10/468,997, filed Feb. 25, 2002, entitled "Global Interrupt and Barrier Networks";

PCT patent application US 2005/025616, filed Jul. 19, 2004, entitled "Collective Network for Computer Structures", published as WO 2006/020298 A2;

U.S. patent application Ser. No. 11/279,620, filed Apr. 13, 2006, entitled "Executing an Allgather Operation on a Parallel Computer";

Computer system 100 comprises a compute core 101 having a large number of compute nodes logically arranged for inter-nodal communication in a regular array or lattice, which collectively perform the bulk of the useful work performed by system 100. The operation of computer system 100 including compute core 101 is generally controlled by control subsystem 102. Various additional processors contained in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 comprises I/O nodes 111A-C (herein generically referred to as feature 111) and compute nodes 112AA-AC, 112BA-BC, 112CA-CC (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes. Each I/O node contains an I/O processor and I/O interface hardware for handling I/O operations for a respective set of N compute nodes 112, the I/O node and its respective set of N compute nodes being referred to as a Pset. Compute core 101 contains M Psets 115A-C (herein generically referred to as feature 115), each containing a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113), which is described in greater detail herein. The I/O nodes in turn are attached to functional network 105, over which they communicate with I/O devices attached to file servers 104, or with other system components. Functional network 105 thus handles all the I/O for the compute nodes, and requires a very large bandwidth. Functional network 105 is, in the preferred embodiment, a set of gigabit Ethernet interfaces to multiple Ethernet switches. The local I/O tree networks 113 may be viewed logically as extensions of functional network 105, since I/O operations proceed through both networks, although they are physically separated from functional network 105 and observe different protocols.

Control subsystem 102 directs the operation of the compute nodes 112 in compute core 101. Control subsystem 102 is preferably a mini-computer system including its own processor or processors 121 (of which one is shown in FIG. 1), internal memory 122, and local storage 125, and having an attached console 107 for interfacing with a system administrator or similar person. Control subsystem 102 includes an internal database which maintains certain state information for the compute nodes in core 101, and various control and/or maintenance applications which execute on the control subsystem's processor(s) 121, and which control the allocation of hardware in compute core 101, direct the pre-loading of data to the compute nodes, and perform certain diagnostic and maintenance functions. Control system communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network operate at significantly lower data rates than the functional network 105.

In addition to control subsystem 102, front-end nodes 103 comprise a collection of processors and memories which perform certain auxiliary functions which, for reasons of efficiency or otherwise, are best performed outside the compute core. Functions which involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
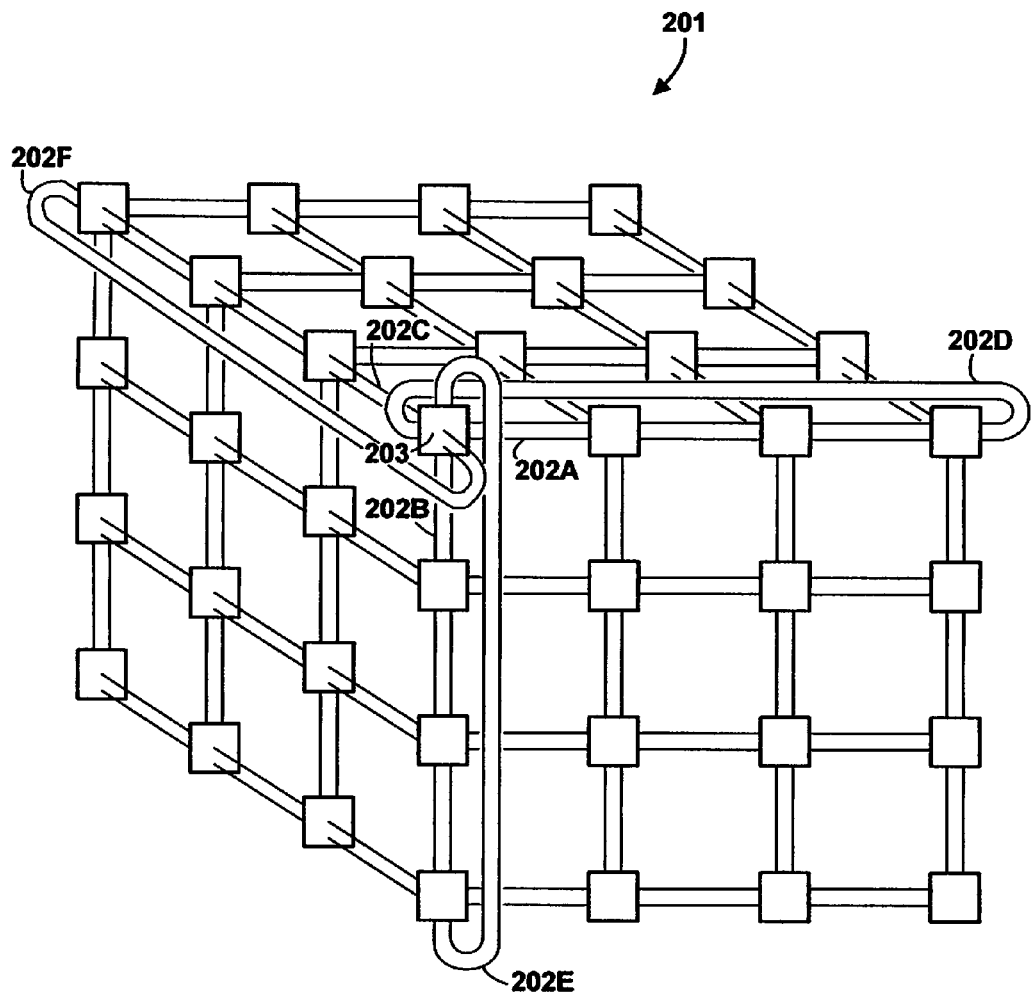
FIG. 2 is a simplified representation of a three dimensional lattice structure and inter-nodal communication network of the system of FIG. 1, according to the preferred embodiment.

Compute nodes 112 are logically arranged for inter-nodal communication in a three dimensional lattice, each compute node having a respective x, y and z coordinate. FIG. 2 is a simplified representation of the three dimensional lattice structure 201, according to the preferred embodiment. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 contains a set of six bidirectional node-to-node communication links 202A-F (herein referred to generically as feature 202) for communicating data with its six immediate neighbors in the x, y and z coordinate dimensions. Each link is referred to herein as "bidirectional" in the logical sense since data can be sent in either direction; it is physically constructed as a pair of unidirectional links.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the preferred embodiment, the node lattice logically wraps to form a torus in all three coordinate directions, and thus has no boundary nodes. E.g., if the node lattice contains dimx nodes in the x-coordinate dimension ranging from 0 to (dimx-1), then the neighbors of Node((dimx-1), y0, z0) include Node((dimx-2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is a preferred embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network contains only a limited number of links, and data flow is optimally supported when running generally parallel to the x, y or z coordinate dimensions, and when running to successive neighboring nodes. Preferably, applications take advantage of the lattice structure by subdividing computation tasks so that much of the data flows to neighboring nodes and along logical paths of the lattice. However, it is impossible to ensure that all inter-nodal communication is local in nature, and there will be a significant amount of network traffic which must traverse multiple nodes, and in some cases must traverse many nodes. A routing mechanism, described in greater detail herein, determines how to route data packets through successive nodes and links of the lattice.

The torus network provides general node-to-node data exchange for application state data generated as a result of executing an application on multiple nodes in parallel. In addition to the torus network, an I/O tree network and a collective network, both of which are separate from and independent of the torus network, are used for communicating certain data. The I/O tree network is used for I/O communications, i.e., for transferring data between a node and an I/O device. The collective network is used for certain reduction operations, i.e., operations in which some mathematical function is generated with respect to data collected from all nodes, and for broadcast of data to all nodes. The I/O tree network and collective network share certain hardware, although they are logically independent networks. The torus network is both logically and physically independent of the I/O tree network and collective network. I.e., the torus network does not share physical links with the other networks, nor is the torus network lattice logically dependent on the arrangement of the other networks.

Figure 3:
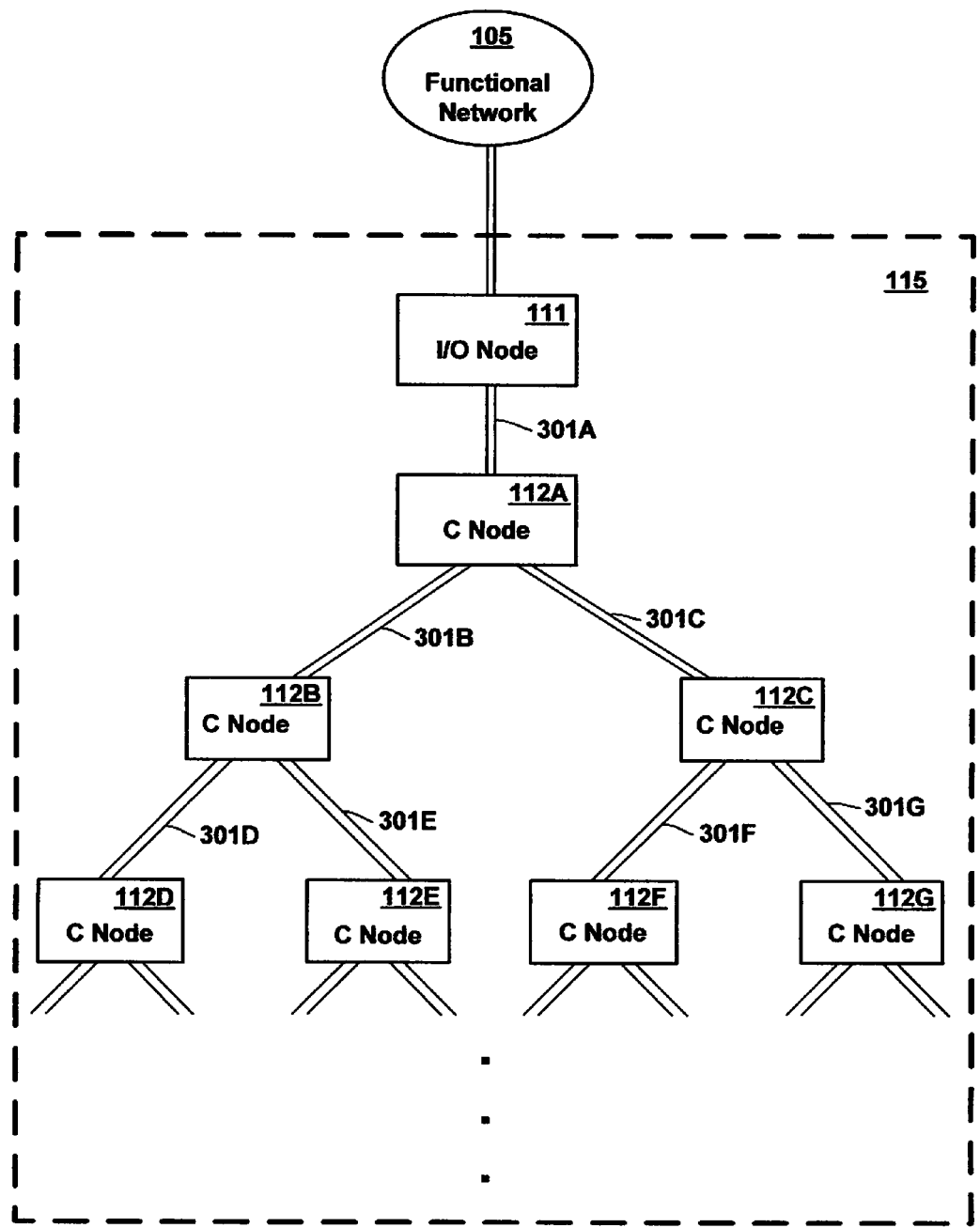
FIG. 3 is a simplified representation of a single subset of compute nodes and associated I/O node connected by a local I/O tree network, according to the preferred embodiment.

FIG. 3 is a simplified representation of a single Pset 115 and its associated local I/O tree network 113, according to the preferred embodiment. Each Pset 115 contains a single I/O node 111, which communicates with functional network 105 using a gigabit Ethernet interface. The compute nodes 112A-G of the Pset are arranged in a binary tree of bidirectional node-to-node communication links 301A-G (herein referred to generically as feature 301). I.e., a binary tree is a tree having a single root node, in which every node has one and only one parent (except the root node, which has no parent), and in which every node has 0, 1 or 2 children. Inbound I/O communications (i.e., those coming from an external device to a compute node) arrive over functional network 105 in I/O node 111, and are transmitted downward on local I/O tree 113 through successive links 301 and intermediate nodes until the destination is reached. Outbound I/O communications are transmitted up the tree 113 to I/O node 111, and thence on the functional network 105.

A separate I/O tree network 113 as represented in FIG. 3 exists for each Pset 115, and each corresponding I/O node 111 has a direct connection with functional network 105. I/O node 111 has one and only one child, which is compute node 112A. Although the representation of FIG. 3 shows two children for every compute node, it will be recognized that some compute nodes may have only one child or have no children.

Figure 4:
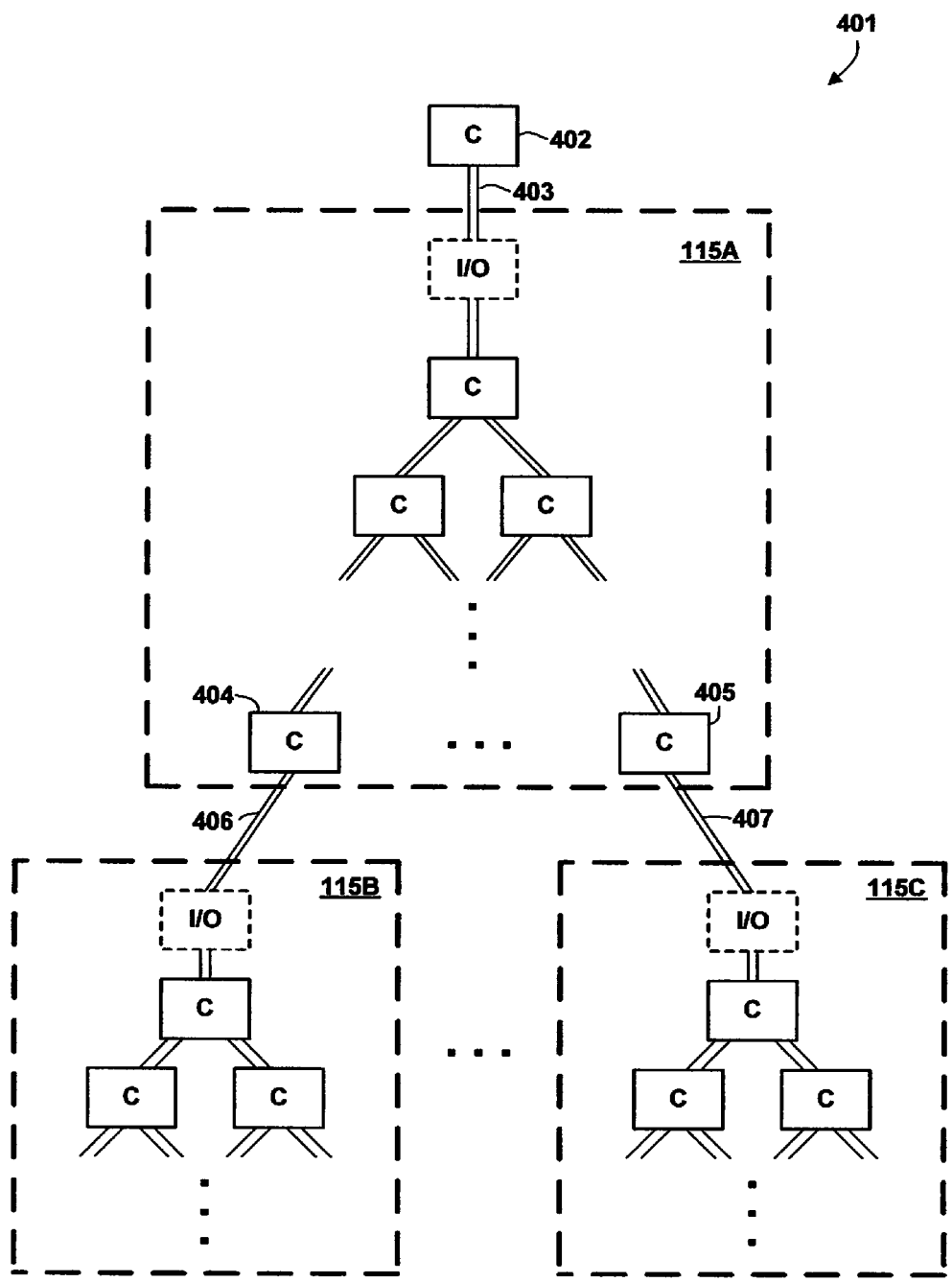
FIG. 4 is a simplified representation of a collective network for certain broadcast and reduction operations, according to the preferred embodiment.

FIG. 4 is a simplified representation of collective network 401, according to the preferred embodiment. Collective network 401 encompasses all the compute nodes 112 in compute core 101. Collective network 401 is logically a single binary tree, having a single compute node 402 at its root.

Physically, collective network is a constructed as a conglomeration of the various local I/O tree networks, which are themselves arranged in a tree. One local I/O network, corresponding to Pset 115A, is at the root of the tree. The I/O node within this network is a child node of root node 402, and communicates directly with root node 402 through bidirectional link 403, which is physically the same as all other links of the local I/O tree network. Root node 402 could alternatively be a compute node in Pset 115A. Additional local I/O tree networks (corresponding to Pset 115B, 115C) are coupled to the root I/O tree network. I.e., each respective I/O node within Pset 115B, 115C is coupled as a child node to respective compute node 404, 405 as parent in Pset 115A via respective bidirectional links 406, 407 (which are physically the same as all other links of the local I/O tree network). Compute nodes 406, 407 are generally leaf nodes of Pset 115A.

In operation, the I/O nodes serve only as conduits for the collective network. Since both the local I/O tree networks 113 and the collective network 401 share the same hardware, each data packet being transmitted on either network contains a field specifying the mode of transmission, i.e., specifying the logical network on which the data packet is being transmitted. If the collective network is specified, the I/O node simply passes the data packet up or down the tree, as the case may be, without further examining it. If the local I/O tree network is specified, the I/O node transmits an outbound data packet on functional network 105. Compute nodes 402, 404, 405 selectively route data in an analogous manner. Thus, although the I/O nodes are physically linked to the collective network, they are not a logical part of the collective network. For this reason they are represented as dashed lines in FIG. 4.

The purpose of the collective network is to support certain reduction and broadcast operations, which necessarily involve all of the compute nodes. Specifically, certain simple mathematical reduction operations can be performed on data gathered from all of the compute nodes to produce composite data. Such data is passed up through the collective network, and at each successive node, data is combined according to the applicable mathematical function be performed to produce resultant composite data for the node and all its children in the collective network. When the data reaches the root node, the resultant composite data at the root node represents the function across all of the compute nodes. Similarly, data can be broadcast to all of the nodes by beginning at the root and, at each successive node, re-transmitting the data to that node's children.

Although the collective network contains physical connections whereby it is possible to communicate data between any arbitrary pair of nodes, it is not efficiently designed for that purpose, nor is it used for that purpose. Node-to-node communication would inevitably burden some nodes (especially the root node) disproportionately. It is the torus network which is designed to support node-to-node communication.

Figure 5:
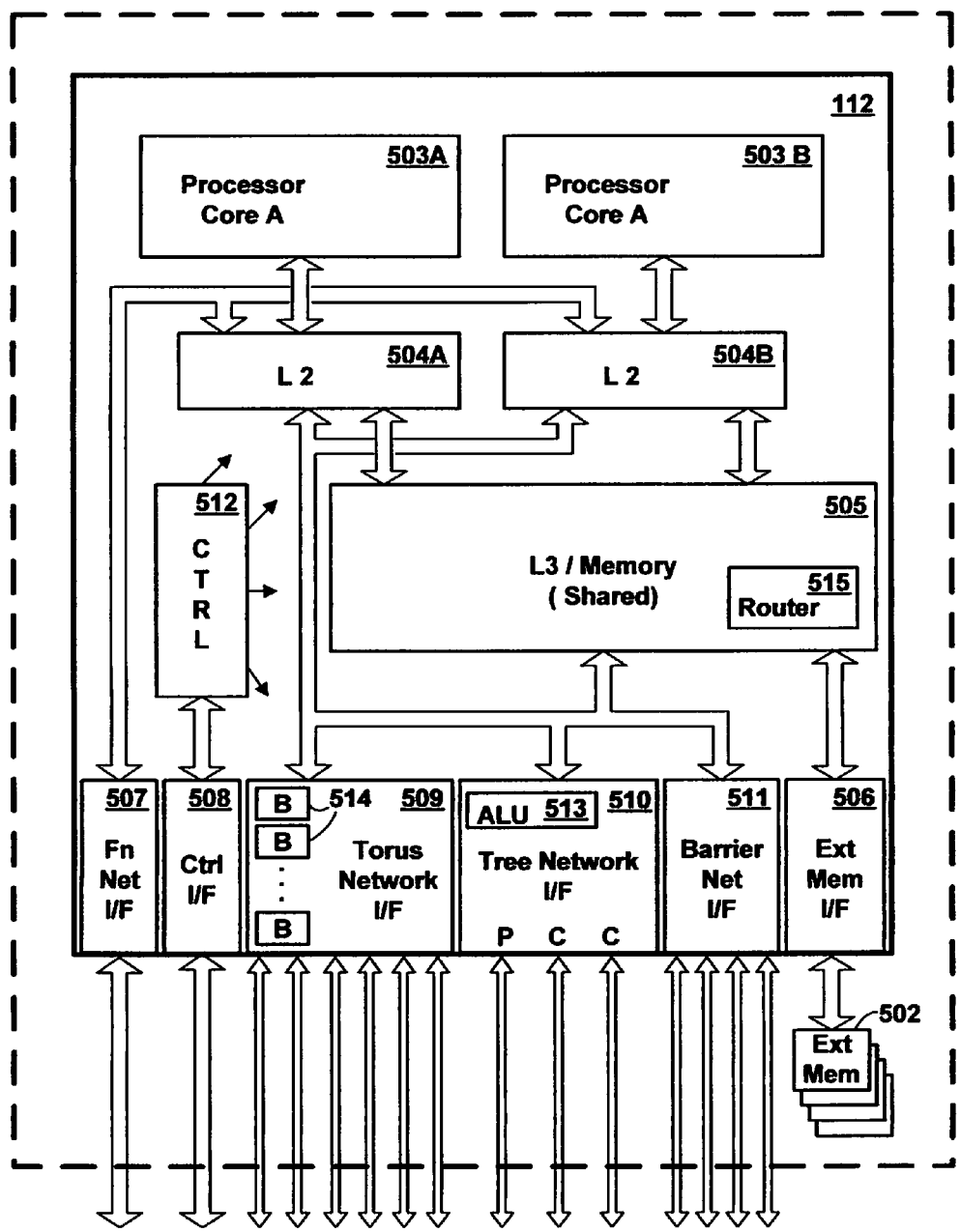
FIG. 5 is a high-level block diagram showing the major hardware components of a node within compute core 101 according to the preferred embodiment.

FIG. 5 is a high-level block diagram showing the major hardware components of a node within compute core 101, and in particular shows the major components of a parallel processor application specific integrated circuit (ASIC) chip 501 which forms the heart of the node, according to the preferred embodiment. The node represented in FIG. 5 could be either an I/O node 111 or a compute node 112, although not all interface connections are present in each node type. Each node in compute core 101, whether an I/O node 111 or a compute node 112, contains a single parallel processor ASIC chip 501, the same physical chip design being used for either type node. The node may also contain a number of memory chips 502 external to ASIC 501.

Parallel processor ASIC 501 contains a pair of processor cores 503A, 503B (herein referred to generically as feature 503). From a hardware standpoint, each processor core 503 is an independent processing entity capable of maintaining state for and executing threads independently (although it does not always operate in this mode, as explained below). Specifically, each processor core 503 contains its own instruction state register or instruction address register which records a current instruction being executed, instruction sequencing logic, instruction decode logic, arithmetic logic unit or units, data registers, and various other components required for maintaining thread state and executing a thread, including a floating point unit, level 1 instruction cache and level 1 data cache (not shown). Each processor core is coupled to a respective level 2 (L2) cache 504A, 504B (herein referred to generically as feature 504), which is in turn coupled to a common L3 cache and on-chip memory 505. The internal chip L3 cache/memory 505 communicates through external memory interface 506 to one or more external memory chips 502 in the same node. ASIC 501 and any external memory chips are preferably packaged on a common printed circuit board assembly (not shown).

In addition to external memory interface 506, which does not communicate outside the node in which ASIC 501 resides, parallel processor ASIC 501 contains five separate external data communications interfaces, all of which communicate externally of the node. These interfaces are: functional network interface 507, control network interface 508, torus network interface 509, tree network interface 510, and barrier network interface 511.

Functional network interface 507 is used for communicating through functional network 105, i.e. is in the preferred embodiment a gigabit Ethernet interface. It is coupled directly with the L2 caches 504 via its own chip-internal bus, a design which allows data to be rapidly transferred to or from another network through the L2.caches, and to be manipulated by a processor core 503. The functional network interface hardware is present in all ASICs 501, but it is only used in the I/O nodes 111. In compute nodes 112, the functional network interface is not used, and is not coupled to anything external of the chip.

Control interface 508 is used for communicating with control system network 106 through the hardware controller 108 for the Pset 115 in which the node resides. This network is used primary for system initialization, maintenance, diagnostics, and so forth. As such, it generally does not require large data capacity, and in the preferred embodiment is an IEEE 1149.1 JTAG interface. Control interface 508 is internally coupled to monitoring and control logic 512, which is represented for simplicity as a single entity, although it may be implemented in multiple modules and locations. Monitoring and control logic can access certain registers in processor cores 503 and locations in nodal memory on behalf of control subsystem 102 to read or alter the state of the node, perform diagnostic scanning, and so forth.

Torus network interface 509 provides connections to the six logical node-to-node bidirectional links 202 connecting the node to the torus network. In reality, each link 202 is implemented as a pair of unidirectional links, so torus network interface actually contains twelve ports, six for incoming data and six for outgoing data. In the case of an I/O node 111, torus network interface 509 is not used.

Torus network interface 509 can be used to transmit a data packet originating in the node in which the interface resides to an immediate neighboring node, but much of the traffic handled by the torus network interface is pass-through traffic, i.e., consists of data packets originating in other nodes and destined for other nodes, which pass through the node of the interface on their way to their ultimate destination. The torus network interface includes a set of six outbound data buffers 514, one buffer corresponding to each of the six node-to-node links 202. An incoming data packet to be passed through to another node is placed in one of the outbound data buffers 514 for retransmission, without reading the data into nodal memory 503 or cache 502. Torus network interface 509 includes routing logic for selecting an appropriate outbound data buffer 514 for retransmission, in accordance with an applicable routing policy, as further explained herein. Thus pass-through data packets impose a minimal burden on the hardware resources of the node (outside the torus network interface). Outbound data originating in the node of the interface is also placed in an appropriate outbound data buffer for transmission. In this case, a software router function 515 executing in the node's processor, which is typically part of a larger computer program such as an operating system, although it could be a stand-alone program, will determine a routing policy for the outbound data, as discussed in further detail herein.

Tree network interface 510 provides connection to the node-to-node bidirectional links of the local I/O tree network 115 and the collective network 401. As explained above, these two networks share the same physical node-to-node links. Each tree network interface contains a single link interface to a parent, and a pair of interfaces to children of the node. As in the case of the torus network, each of the logical bidirectional links is implemented as a pair of unidirectional links, so the tree network interface actually contains six ports, two for the parent and four for the two children. Both the I/O nodes 111 and the compute nodes 112 use the tree network interface, but it is not necessarily true that all ports in the interface are connected. Some of the nodes will have no children or only one child, and the single root node 402 of the collective network will have no parent.

Tree network interface 510 includes or is closely coupled to a dedicated arithmetic logic unit (ALU) 513 for performing certain mathematical reductions of data being gathered up the tree. ALU 513 performs a limited set of simple integer arithmetic and logical operations on data. For example, ALU 513 may perform such operations as integer addition, integer maximum, bitwise logical AND, OR and XOR, etc. In general, the operands of operations performed by ALU 513 are obtained from the child nodes of the node performing the operation, and from the node itself, and the result is then forwarded to the parent of the node performing the operation. For example, suppose it is desired to find a sum of a respective nodal state value from each compute node in the compute core 111. Beginning with the leaf nodes, each node adds the state values, if any, received from its children to its own state value, and transmits the result to its parent. When a data packet containing a partial sum reaches an I/O node, the I/O node simply forwards it on to the next node of the collective network, without changing any of the data. When the resultant data packet reaches the root node and the state value sum contained therein is added to the root node's value, the resulting sum is the sum of all state values from the compute nodes. Similar operations can be performed using other mathematical functions in ALU 513. By providing a dedicated ALU in the tree network interface, global reduction operations can be performed very efficiently, with minimal interference to processes executing in processor cores 503. A data packet representing partial reduction data arrives in the tree network interface from a child, provides operands for ALU 513, and a successor packet with resultant data is forwarded up the tree to the node's parent from tree network interface, without the data ever having to enter the node's memory 503 or cache 502.

Barrier network interface 511 provides an interface to the barrier network, and provides global interrupt and barrier capability to the compute nodes. The barrier network is a set of four independent channels logically coupled to all nodes which reflect a global logical OR of the input from every node. Inverted logic can be used to produce a global AND. The barrier network can be used as a "barrier" for process synchronization, which prevents a set of nodes from proceeding past a certain execution stop point until all nodes have reached the stop point as indicated by the signals on the barrier. It can also be used as a global interrupt.

Each compute node 112 comprises a single addressable nodal memory, which is embodied as on-chip memory 505 and external memory 502. From a hardware standpoint, all of nodal memory is accessible by either processor core 503A, 503B. Each compute node can operate in either coprocessor mode or virtual node mode, independently of the operating modes of the other compute nodes. When operating in coprocessor mode, the processor cores of a compute node do not execute independent threads. Processor Core A 503A acts as a primary processor for executing the user application sub-process assigned to its node, while Processor Core B 503B acts as a secondary processor which handles certain operations (particularly communications related operations) on behalf of the primary processor. When operating in virtual node mode, the physical node is logically divided into two "virtual nodes" capable of independent thread execution. I.e., in virtual node mode, nodal memory is partitioned between the two processors, and each processor core executes its own user application sub-process independently and independently maintains process state in its own partition, although these sub-processes may be, and usually are, separate sub-processes of a common user application. Because each node effectively functions as two virtual nodes, the two processor cores of the virtual node constitute a fourth dimension of the logical three-dimensional lattice 201. I.e., to specify a particular virtual node (a particular processor core and its associated subdivision of local memory), it is necessary to specify an x, y and z coordinate of the node (three dimensions), plus a virtual node (either A or B) within the node (the fourth dimension).

While a system having certain types of nodes and certain inter-nodal communications structures is shown in FIGS. 1-4, and a typical node having two processor cores and various other structures is shown in FIG. 5, it should be understood that FIGS. 1-5 are intended only as a simplified example of one possible configuration of a massively parallel system for illustrative purposes, that the number and types of possible devices in such a configuration may vary, and that the system often includes additional devices not shown. In particular, the number of dimensions in a logical matrix or lattice for inter-nodal communication might vary; a system might have other and/or additional communication paths; and a system might be designed having only a single processor for each node, with a number of processors greater than two, and/or without any capability to switch between a coprocessor mode and a virtual node mode. While various system components have been described and shown at a high level, it should be understood that a typical computer system contains many other components not shown, which are not essential to an understanding of the present invention. Furthermore, although a certain number and type of entities are shown in the simplified representations of FIGS. 1-5, it will be understood that the actual number of such entities may vary and in particular, that in a complex computer system environment, the number and complexity of such entities is typically much larger.

Nodal Routing Policies

A data packet transmitted via torus network 201 may pass through one or more intermediate nodes en route to its final destination node. In the preferred embodiment, a software router function 515 in the original sending node determines an initial link on which to transmit the packet and routing policy for routing the packet through any intermediate nodes to its final destination. The routing policy is transmitted with the packet. Each intermediate node in the path determines a next link for routing the packet to its final destination node, based on the routing policy. The software router function is represented conceptually in FIG. 5 as a component of memory 505, it being understood that it may be cached in any of various caches for execution on a processor 503.

Each intermediate node in the path has six physical links on which it can re-transmit a received packet, and therefore the routing determination made in the intermediate node amounts to choosing one of the six links. Preferably, each intermediate node implements an implicit routing according to the specified routing policy, as described herein. The implicit routing implements two routing rules. The first rule is that a link requiring no more than a minimal number of hops (node traversals) to reach its ultimate destination is chosen. I.e., a link going in a direction away from the destination, and therefore ultimately requiring more hops, is rejected (even though it is possible that, due to congestion in the more direct path, such a path would be faster).

The second rule implements a sender-specified priority for choosing one among multiple links requiring the minimal number of hops. It will be noted that there can be at most three links requiring the minimal number of hops, since the other three must move in respective directions opposite one of the three. In the preferred embodiment, the priority is based on coordinate path (e.g. choose x-coordinate path first, then y-coordinate, then z-coordinate). There are six possible permutations of coordinate preference: (X,Y,Z), (X,Z,Y), (Y,X,Z), (Y,Z,X), (Z,X,Y), (Z,Y,X). One of these six routing policies is chosen by the original sending node, and this information is transmitted with the packet. When an intermediate node receives the packet, hardware logic in torus network interface 509 examines the destination coordinates to determine the coordinate directions in which any hops remain to be traversed. If more than one coordinate direction remains to be traversed, the torus network interface chooses an outbound link from the intermediate node based on the routing policy information (second rule priority) in the packet.

This simple implicit routing technique has the advantage of being easily implementable in hardware in the torus network interface 509 of intermediate nodes, and does not require messages to be stored in nodal memory of intermediate nodes while a software procedure executing on a processor 503 determines an appropriate routing. It will be observed that any of various alternative implicit routing techniques could be used. For example, a routing priority could be based on the number of remaining traversals in a coordinate axis (e.g., if the message has to traverse Nx links in the x-coordinate direction, Ny links in the y-coordinate direction, and Nz links in the z-coordinate direction, choose the link corresponding to the largest (or smallest) value of Nx, Ny or Nz, with some other priority being used to break a tie). Alternatively, the priority could be based on the traffic in the outbound buffers (e.g. choose the link having the fewest number of packets in its outbound buffer), with some other priority, such as one disclosed above, being used to break a tie. This latter alternative has a primitive capability to dynamically route to avoid contention, but since the node must base its routing priority solely on its own state, it is unable to see ahead on a path to avoid contention.

The original sending node chooses one of the six routing policy preferences according to the second rule above, and transmits this information with the packet. A simple routing implementation would be for the sender to always choose the same routing policy preference. In accordance with the preferred embodiment of the present invention, the sender's choice of routing policy is modified by using one or more network performance enhancement techniques disclosed herein, and intended to avoid congestion. In particular, in accordance with the preferred embodiment, the sending node uses a technique of dynamic global mapping of contended links to choose a best routing policy, as described herein. One or more of the additional techniques described herein may be used in combination with dynamic global mapping of contended links.

Figure 6:
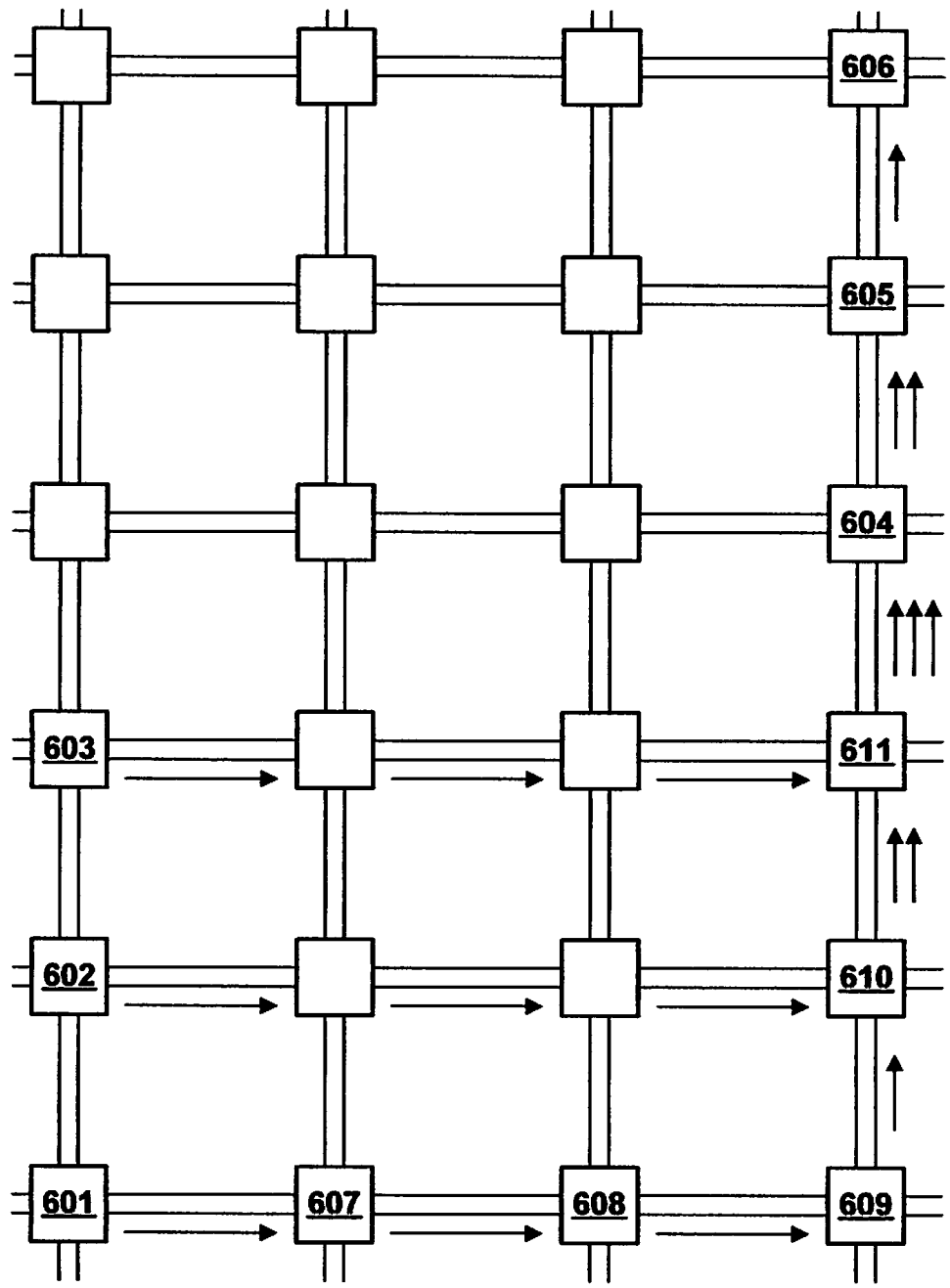
FIG. 6 is a simplified illustration of the operation of a network routing policy and congestion which may result from implementing consistent routing policies.

FIG. 6 illustrates a simple example of network routing operation, and congestion which may result from implementing a strategy of consistently using the same routing policy for all packets in each sending node, as described above. For illustrative purposes only, FIG. 6 shows a 2-dimensional node lattice having a relatively small number of nodes, it being understood that an actual network in accordance with the preferred embodiment is much larger and more complex.

In the example of FIG. 6, it is assumed that node 601 is sending data to node 604, node 602 is sending data to node 605, and node 603 is sending data to node 606. All sending nodes consistently follow a routing policy of choosing the x-coordinate first, then the y-coordinate. The results of such a routing technique are indicated by the arrows.

Referring to FIG. 6, one or more data packets from node 601 are bound for node 604. Multiple minimal paths exist, but all require that the packet either be transmitted in the x-coordinate dimension toward node 607, or in the y-coordinate dimension toward node 602. I.e., to go in the opposite direction in either the x or y dimension would be traveling away from node 604, and ultimately require more than a minimal number of hops. Since the routing policy favors choosing the x-coordinate first, the link to node 607 is chosen. The packets are therefore transmitted to node 607. Intermediate node 607 follows the same routing policy (which is transmitted with the packets), and routes the packets to node 608, which in turn routes them to node 609. Once each packet reaches node 609, the only minimal path link remaining is in the y-coordinate dimension toward node 610, so that link is chosen, notwithstanding the routing policy preference for choosing the x-coordinate link. For the same reasons, intermediate node 610 chooses the link to node 611, which in turn chooses the link to node 604, the packet's final destination.

The packets originating in nodes 602 and 603 are routed similarly. I.e., each packet is routed first in the x-coordinate dimension until it reaches nodes 610 or 611, respectively, and thence in the y-coordinate dimension toward its final destination.

It will be observed that, in this situation, the link between nodes 611 and 604 is particularly burdened, because the traffic from nodes 601, 602 and 603 to nodes 604, 605 and 606, respectively, all passes through this link. It will further be observed that congestion of the link between nodes 611 and 604 is unnecessary from the standpoint of the network's physical arrangement of links. E.g., the traffic could have been routed to avoid this link entirely, or so that the packets are distributed among different links to avoid contention. Finally, it will be noted that, even if the sending node attempts to take into account the congestion on the immediate links, it will not necessarily avoid contention of the type depicted in FIG. 6, so long as it has only local network state information available to it. For example, even if sending nodes 601, 602 and 603 consider the congestion on their immediate links, they can not see the contention at node 611, and are therefore likely to choose the exact same paths in the x-coordinate dimension.

Dynamic Global Mapping of Contended Links

In accordance with the preferred embodiment, congestion can be relieved in at least some circumstances and network performance improved by collecting network usage data from multiple nodes, and using this usage data to more intelligently determine a routing policy. Specifically, the sending node still selects a routing policy and propagates this information with the packet, forcing the intermediate nodes to follow the policy indicated. But the sending node has more complete congestion information available to it to make a better routing decision.

Obviously, it is desirable to avoid undue overhead in collecting network usage data. Among the advantages of the Blue Gene architecture described herein is the ability to use collective network 401 to obtain network usage data and disseminate this data to all of the nodes. Not only is it unnecessary to collect usage data using the node-to-node communications lattice, but an efficient hardware mechanism is provided for reducing data from many nodes and transmitting the result of data reduction operations.

As used herein, "network usage data" means data relating to network utilization which is obtained from a substantial number of different nodes. This could be usage data for all nodes of a parallel computing system, or could be usage data for some substantial subset of nodes. For example, it might be usage data for a communicator set, or for a subset of nodes allocated to a particular application. In the preferred embodiment, the usage data is collected for all compute nodes 112 of compute core 101; this implementation is chosen in large part because collective network hardware is constructed to reduce data from all the nodes simultaneously. There could be alternative parallel computing architectures in which it would be advantageous to collect usage data for subsets of nodes.

"Network usage data" could take any of various forms. In accordance with the preferred embodiment, network usage data comprises a respective N-bit utilization value for each outbound buffer of the torus network in each compute node. There being six outbound torus network links in each node and six corresponding outbound buffers, the number of N-bit utilization values collected is equal to six times the number of nodes. The N-bit utilization value indicates the degree to which the corresponding outbound buffer is full. I.e., a high utilization value indicates a link with high contention.

In one variation of the preferred embodiment, N is 1. In this case, the single bit of utilization value would be set to one if the number of packets waiting in the corresponding outbound buffer exceeded some threshold, and would be zero otherwise. In other variations of the preferred embodiment, N is more than one, indicating with greater granularity the amount of data waiting in the corresponding outbound buffer. In general, it is expected that N would not be large. While there may be some justification for having a 2-bit or 3-bit (or possibly more bit) utilization value for additional granularity, there are diminishing returns for increasingly larger values of N.

A simple optimum routing is determined by summing the N-bit values associated with each link through which a data packet must pass, and comparing the sums associated with multiple different possible routes; a lower total value indicates a less congested, and therefore better, route. However, alternative formulae may be used.

"Network usage data" could alternatively be something other than a respective value associated with each outbound data buffer. For example, "network usage data" might be a respective value associated with each node, indicating the degree of congestion at that node. Such a value might be particularly useful, e.g., where there is architecturally only a single outbound data buffer in each node, and it is difficult to determine the degree to which each individual link is congested. Other measures of node congestion could be used, such as a number of packets transmitted over a link or from a node during a recent time interval, or an average time it takes packets to be re-transmitted from a node.

In another alternative embodiment, "network usage data" comprises enqueued messages at the originating nodes and their corresponding routing policies, which could be used alone or in conjunction with other network usage data such as that described above. In the preferred embodiment, each "message" comprises one or more packets. Due to certain constraints on the software architecture, all packets of a message must arrive at the final destination in the order sent, and therefore all packets of a message use the same routing. Some messages comprise a large number of packets. By collecting data on enqueued messages at the originating nodes and their respective routing policies, the path taken by each packet within a message can be predicted, and thus the behavior of the network in the near future can be predicted.

Figure 7:
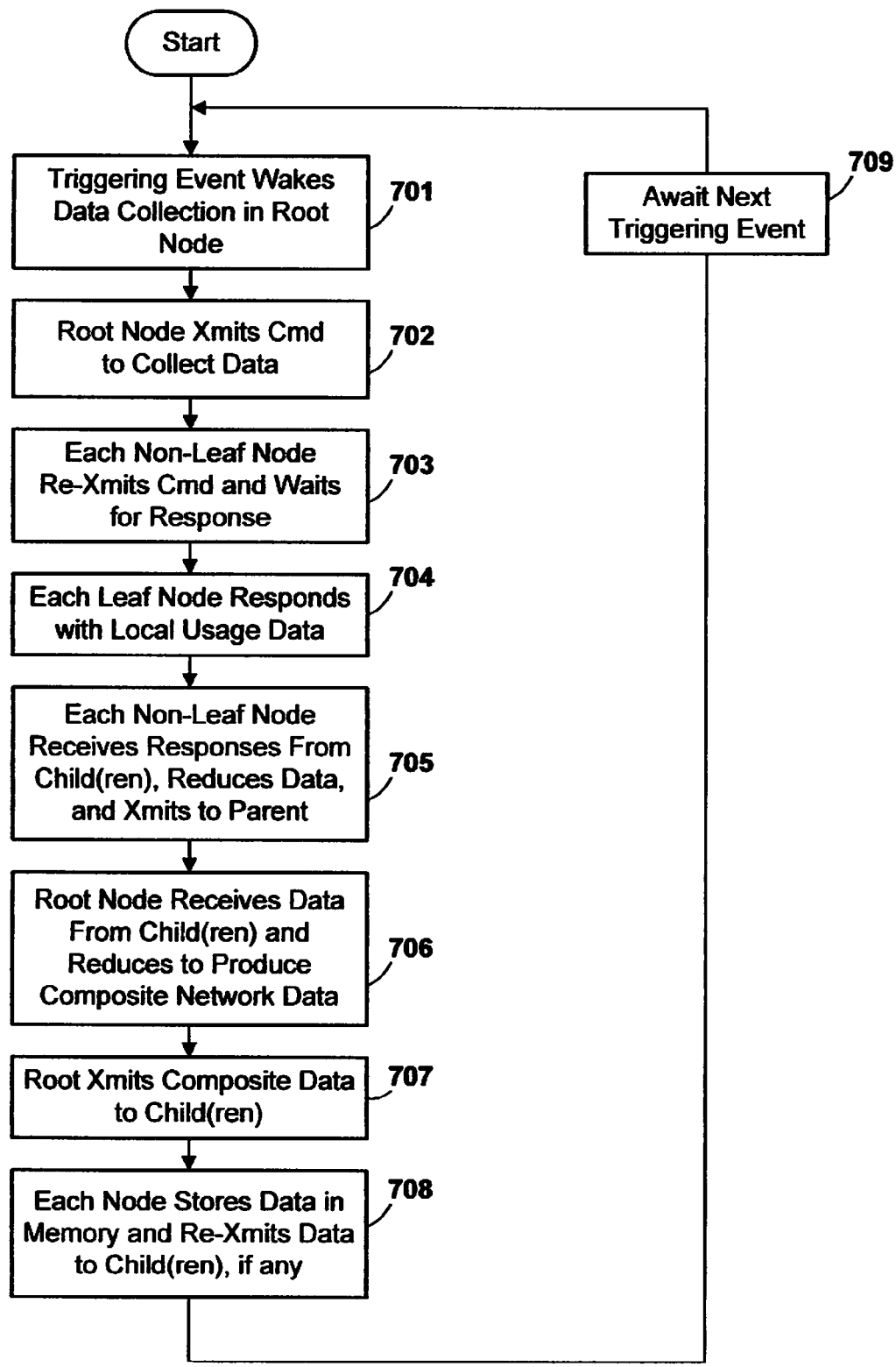
FIG. 7 is a flow diagram showing the process of collecting and disseminating network usage data, according to the preferred embodiment.

FIG. 7 is a flow diagram showing the process of collecting network usage data from multiple nodes and disseminating the result to the various nodes, according to the preferred embodiment and certain variations thereof. In the preferred embodiment, network usage data is periodically updated using collective network 401.

Referring to FIG. 7, a process which regulates and initiates the gathering and disseminating network usage data resides in root node 402. This data gathering regulating process wakes up responsive to a triggering event to begin collection of network usage data (step 701). Preferably, the gathering of data is triggered at periodic time intervals, but it could be based on other triggering events, alone or in combination. For example, the triggering event might alternatively or additionally be responsive to network conditions, such as the detection of significant network traffic or congestion.

Upon waking up the data gathering process, the root node transmits a command to its child or children to initiate network usage data collection (step 702). This command is then transmitted down the tree of nodes in collective network 401 to each node of the network. I.e., at each node which receives the command and has one or more children, the receiving node re-transmits the command to each child of the receiving node and waits for the child(ren) to respond (step 703).

If the data collection command is received by a leaf node (a node without children), the leaf node collects network usage data local to the leaf node, and transmits this data to its parent (step 704). When a node having at least one child receives a response from all its children, it combines the network usage data received from its children with network usage data local to itself, and transmits the combined (reduced) network usage data to its parent (step 705). When the root node receives data from all its children, it likewise combines the received data with its own local network usage data to produce network usage data for the entire torus network (step 706).

In the preferred embodiment, network usage data is an N-bit value for each outbound buffer in each node. The collective network usage data for all nodes is an array of N-bit values, the array containing 6M elements, where M is the number of compute nodes in compute core 101. Each outbound buffer in each node corresponds to a fixed, mapped element of the array. This array requires the transmission of 6×M×N bits. Preferably, at step 704, each leaf node transmits an array of 6M N-bit values, in which all array elements are zero except for those array elements corresponding to the six outbound buffers of the leaf node itself. These array elements are set to appropriate values corresponding to the contents of the leaf node's buffers. At step 705, each node which is not a leaf node produces a reduced array representing composite network usage data of itself and its descendants. This reduced array is a bit-wise logical OR of the arrays received from its child(ren) and an array representing the local network usage data of the node itself, i.e.:

Reduced_Array(NodeP)=Received_Array(Child1) OR

Received_Array(Child2) OR

Local_Array(NodeP); (1)

where Local_Array(NodeP) is produced in the same manner as the array produced by a leaf node. At step 706, the root node produces a reduced array for the entire torus network in exactly the same manner using equation (1), although this data is not forwarded to a parent, the root node having no parent. This bit-wise logical OR operation is performed in tree network ALU 513, without requiring intervention by software processes in the various nodes.

When all nodes have responded and the responses have been transmitted back up the collective network tree to the root node, the resultant reduced array at the root node, which represents all nodes of the network, is broadcast to all nodes for use in making routing decisions. I.e., the root node transmits the resultant array to its child(ren) (step 707). Each node in turn which receives the array stores it in its local memory for use in making routing decision, and re-transmits it to its own child(ren), if any (step 708). The root node's regulating process goes to sleep and awaits the next triggering event (step 709), when updated network usage data will be collected anew.

Figure 8:
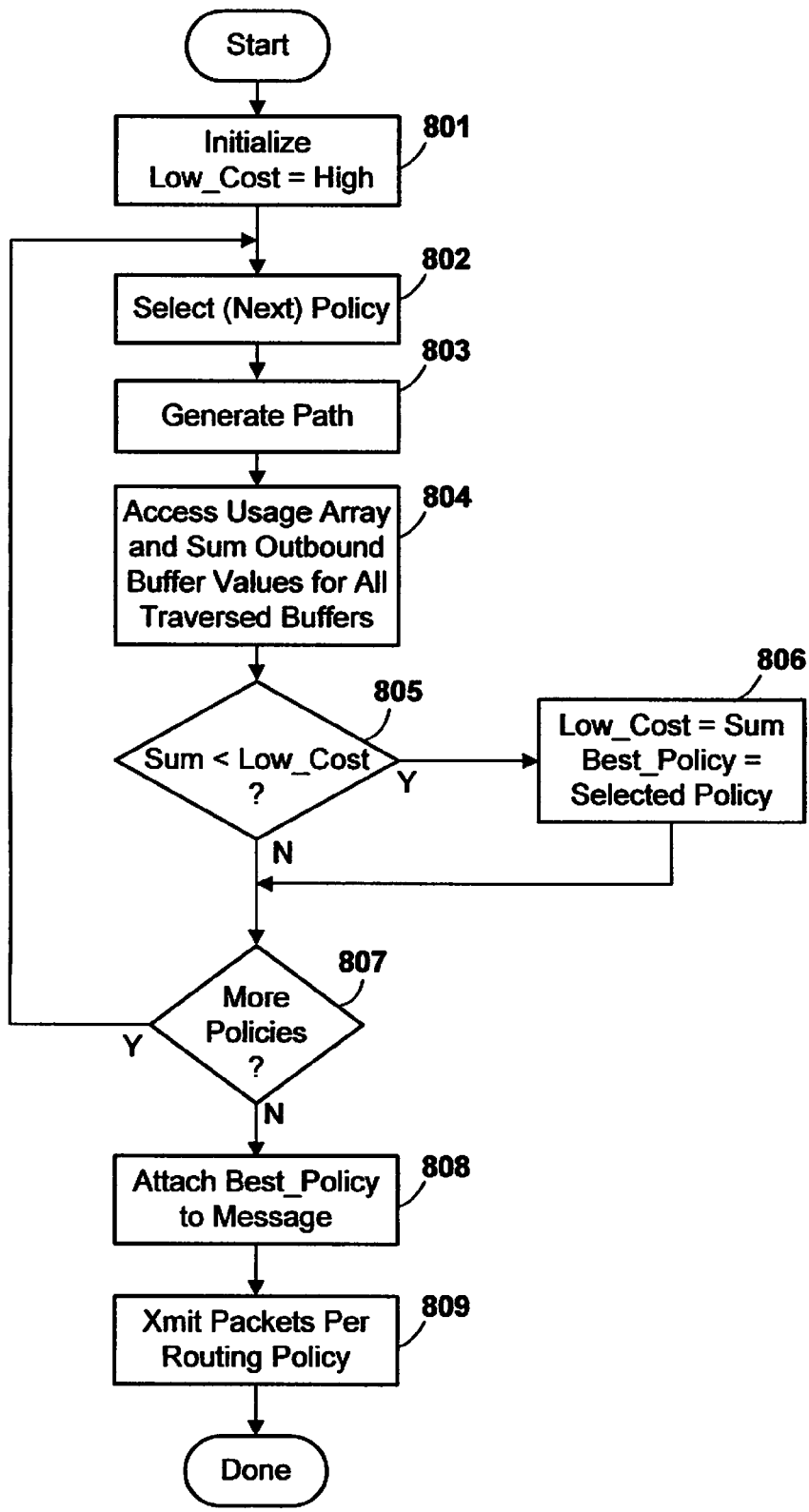
FIG. 8 is a flow diagram showing the process of using network usage data to determine a routing policy for a message, according to the preferred embodiment.

Once the network usage data is collected and disseminated as described above, it is stored in each node and used by that node to determine a routing policy for each message originating in the node. FIG. 8 is a flow diagram showing the process of using network usage data to determine a routing policy for a message to be transmitted, according to the preferred embodiment.

Referring to FIG. 8, when a software process executing in a node generates a message to be transmitted to another node (which may contain one or more packets), a procedure for assigning a routing policy to the message is initiated. This procedure initializes a local low_cost variable to a high value (step 801).

A (next) routing policy is then chosen from among the six possible routing policies which may be associated with the message, i.e., from among the policies (X,Y,Z), (X,Z,Y), (Y,X,Z), (Y,Z,X), (Z,X,Y), and (Z,Y,X), where the order of X, Y and Z designates the order of coordinate path preference (step 802). For the selected policy, a path through one or more nodes to the final destination is determined (step 803). The array of network usage data is then accessed to obtain the N-bit outbound data buffer value corresponding to each buffer which must be traversed along the path to the destination, and these N-bit buffer values are summed (step 804). The sum of all the N-bit buffer values represents a rough measure of the degree of congestion along the path which will be followed if the selected policy is used for routing the message.

The sum thus computed for the selected policy is then compared to the variable low_cost (step 805). If the sum is less than the value of low_cost, then the path using the selected policy is the least congested path analyzed thus far. In this case, the 'Y' branch is taken from step 805; the value of low-cost is updated with the sum for the selected policy, and the best_policy is set to the selected policy (step 806). If the sum is greater than the value of low_cost, then the 'N' branch is taken from step 805, and step 806 is by-passed.

If any more routing policies remain to be evaluated, the 'Y' branch is then taken from step 807, and a next routing policy is selected at step 802. When all six routing policies have thus been evaluated, the 'N' branch is taken from step 807. The value of best_policy then indicates the policy which produces the least congested path, and that policy is associated with the message to be transmitted (step 808). The individual packets of the message are then transmitted and routed according to the chosen policy (step 809).

If one applies the technique described above to the example of FIG. 6, it will be observed that a sending node, such as node 601, 602 or 603, will be able to detect that there is congestion on the link from node 611 to node 604, and that if a routing policy which prefers the x-coordinate is used, this link must be taken. If, on the other hand, a y-coordinate preference is used, then data can be routed to its final destination without traversing the link between nodes 611 and 604. In this case, due to the congestion of the link, the summed N-bit buffer values should be higher for the routing policy which prefers the x-coordinate, and accordingly the Y-coordinate routing policy preference will be used, relieving at least some congestion on the link between nodes 611 and 604.

FIGS. 7 and 8, and the accompanying text, describe procedures appropriate for use with certain types of network usage data, in particular where, as in the preferred embodiment, the network usage data is a respective N-bit value for each outbound data buffer. Appropriate modifications to the procedures represented by FIGS. 7 and 8 can be made for other types of network usage data.

In particular, where network usage data comprises enqueued messages at the originating nodes and their corresponding routing policies, as described above, at some stage such data should be translated into data indicating a degree of congestion at node locations by projecting the paths of the various enqueued messages. This could be performed in the local nodes before transmitting local node data to a parent, or could be performed in the root node after receiving all responses from the nodes of the network, or could be performed again in the local nodes after receiving the collective data transmitted by the root node. Depending on the form of the data being reduced, it may be necessary to sum values or perform some other arithmetic/logic operation to reduce data. In one example, enqueued message data could include a limited number of messages in each node, the number of packets remaining in each, the destination, and the routing policy. Where many messages are enqueued in a single node, the enqueued message data would include only the messages containing the largest number of packets in that node. Enqueued message data would be used to project future node contention by projecting the path to be followed by each message (using the routing policy and the destination), and adding to each traversed link the number of packets remaining in the message. By summing all such enqueued data, an approximation of the number of packets to be handled in the near future by each link can be obtained., providing a picture of network congestion.

Semi-Randomly Varying Routing Policies for Different Messages

In addition to dynamic global mapping of contended links as explained above, congestion may be relieved in at least some circumstances and network performance improved by a routing strategy which introduces semi-random variations into the chosen routing policies for different messages sent from the same local node. Introducing semi-random variations in a chosen routing policy tends to mix up the set of paths chosen from a given node. Where some nodes are sending or receiving a lot of packets, such variations will tend to scatter the paths chosen for different messages, thus reducing the congestion of any single path.

As used herein, "semi-random" includes any technique which introduces a randomly appearing or distributed component to the selection of a routing policy, and thus causes differing routing policies to be arbitrarily chosen for similarly situated messages (i.e., sent from the same sender to the same destination under similar conditions). As is well known, a computer being a deterministic machine, in a pure sense there is in fact no such thing as a "random" event in a computer. "Semi-random" includes anything which gives the appearance of being random (such as being based on any of various known random number generation algorithms), or which varies the choice of routing policy in a deliberately distributed manner, such as a round-robin or similar technique. A routing strategy based on semi-random variations in routing policy choice is described in greater detail in commonly assigned copending U.S. patent application Ser. No. 11/539,270, filed Oct. 6, 2006, entitled "Method and Apparatus for Routing Data in an Inter-Nodal Communications Lattice of a Massively Parallel Computer System by Semi-Randomly Varying Routing Policies for Different Packets", which is herein incorporated by reference.

A semi-random routing strategy can be used in conjunction with the dynamic global mapping of contended links technique of the preferred embodiment in various ways. For example, where the sum of utilization values for multiple routing policies is the same, or the difference between the sums is less than some low threshold, then it can be assumed that any such routing policy is equally good from a standpoint of using contended links. In this case, a semi-random routing strategy could be used to choose different routing policies for different messages from among those policies deemed approximately equal in terms of contention. If one policy has a significantly lower sum of utilization values, the difference being in excess of the threshold, then that policy should be preferred in accordance with the technique of dynamic global mapping of contended links, described above.

Routing Through a Transporter Node

In addition to the routing techniques explained above, congestion may be relieved in at least some circumstances and network performance improved by a routing strategy which routes packets through a specified intermediate node en route to a final destination, the intermediate node being referred to as a transporter node. Routing through a transporter node gives the system greater flexibility in routing around link congestion Preferably, routing through a transporter node is accomplished by encapsulating the data packet specifying the ultimate destination within a shell data packet specifying the transporter node as a destination. Each intermediate node in the path to the transporter sees the packet as one bound for the transporter node, and routes it accordingly. Upon reaching the transporter node, the packet is examined, found to contain a packet destined for another node, and transmitted to the other node.

Generally, it is expected that transporter node routing will be used responsive to static application profiling. I.e., profiling data will be collected regarding the behavior of the application, and areas of congestion may be identified. The application will then be manually altered so that some messages will be routed through respective transporter nodes to avoid the congestion. However, transporter node routing could alternatively be dynamically or automatically performed. A routing technique based on routing through a transporter node is described in greater detail in commonly assigned copending U.S. patent application Ser. No. 11/539,300, filed Oct. 6, 2006, entitled "Method and Apparatus for Routing Data in an Inter-Nodal Communications Lattice of a Massively Parallel Computer System by Routing Through Transporter Nodes", is herein incorporated by reference.

A technique of routing through transporter nodes can be used in conjunction with the dynamic global mapping of contended links technique of the preferred embodiment in any of various ways. In general, it is expected that even where transporter nodes are used, they will be used only for some messages, and dynamic global mapping of contended links as described above can be used for other messages. However it is determined to use a transporter node, the technique of dynamic global mapping of contended links can be used to select a routing policy from the sender to the transporter, and from the transporter to the ultimate destination. Furthermore, global mapping data identifying areas of congestion collected as described above with respect to FIG. 7 could be used to make dynamic determinations to use transporter nodes.

Dynamically Adjusting Local Routing Strategies

In addition to the routing techniques explained above, congestion may be relieved in at least some circumstances and network performance improved by dynamically altering the strategies used in the local nodes. Preferably, the network performance is monitored and routing strategies are periodically updated to improve performance. I.e., commands are set to individual nodes to alter their routing strategies in a manner to improve overall network performance. Any of the above discussed techniques could be chosen.

Preferably, routing strategies are updated at implicit barriers. An implicit barrier is a synchronization point in the application, at which all nodes must halt execution of the application until they are synchronized.

A routing technique based on dynamically adjusting local routing strategies is described in greater detail in commonly assigned copending U.S. patent application Ser. No. 11/539,329, filed Oct. 6, 2006, entitled "Method and Apparatus for Routing Data in an Inter-Nodal Communications Lattice of a Massively Parallel Computer System by Dynamically Adjusting Local Routing Strategies", which is herein incorporated by reference.

A technique of dynamically adjusting local routing strategies simply alters local routing strategies on a dynamic basis to achieve better network performance, and therefore chooses one among multiple possible techniques for each of a plurality of nodes. It may be used in conjunction with the dynamic global mapping of contended links technique of the preferred embodiment because the latter may be one of the techniques chosen. For example, it may be determined that under certain network conditions, a technique of dynamic global mapping of contended links achieves better performance, and that under other network conditions, some other technique such a using a fixed, static routing policy or a routing technique of semi-randomly varying the routing policy works better. The network may be monitored for the presence of the determining conditions, and the local nodes commanded to follow the appropriately determined technique.

Additional Variations

In the preferred embodiment and certain variations described above, a routing policy is determined by a sending node and is followed by each intermediate node in the path. One reason for this approach is that, in certain software processes, it is necessary that different packets of the same message arrive at the final destination in the order in which they are transmitted. It is therefore necessary that all packets of a message use the same routing. In some architectures, it is not necessary that all packets of a message use the same routing, and in these architectures different routings could be chosen for different packets. In particular, it would alternatively be possible to implement routing policies in which each intermediate node independently determines a next link, and is not bound by a routing policy determined by the original sender.

In the preferred embodiment and certain variations described above, a routing policy includes the constraint that a minimal path is always chosen. This constraint reduces the number of choices that must be made and simplifies decision logic. However, there may be circumstances in which it is desirable to route through paths which are non-minimal, and the present invention is not limited to implementations in which the routing policies are bound by a minimal path constraint.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as memory 122 and storage devices 109A, 109B, 125, and in FIG. 5 as memory 505.

Although a specific embodiment of the invention has been disclosed along with certain alternatives, it will be recognized by those skilled in the art that additional variations in form and detail may be made within the scope of the following claims:

What is claimed is:

1. A computer-implemented method for inter-nodal packet routing in a parallel computer system, said parallel computer system comprising a plurality of nodes arranged in a regular lattice network of node-to-node communications links for inter-nodal communications, each node comprising at least one processor and a nodal memory, said method comprising the steps of:

executing an application in parallel on a first plurality of nodes of said parallel computer system, each node of said first plurality of nodes executing a respective application sub-process of said application in the respective at least one processor of the respective node, wherein each of at least some of said application sub-processes generates respective data for transmission, in one or more respective packets using said regular lattice network, to respective one or more other said application sub-processes each executing in a respective node of said first plurality of nodes of said parallel computer system;

periodically obtaining respective local usage data from each node of a second plurality of nodes of said parallel computer system, said second plurality of nodes including at least some nodes of said first plurality of nodes, each said local usage data representing current utilization of one or more components of the corresponding node by current network traffic, said respective local usage data from each node of said second plurality of nodes being combined to form composite network usage data with respect to usage of said regular lattice network of node-to-node communications links, said composite network usage data comprising respective data representing current utilization of each of a plurality of components of said regular lattice network by current network traffic;

periodically providing said composite network usage data to each node of said second plurality of nodes of said parallel computer system;

at each of at least some of said second plurality of nodes of said parallel computer system, concurrently analyzing most recently obtained said composite network usage data to identify a respective optimum path for each of a respective plurality of said packets within the corresponding node, each said packet being transmitted on said regular lattice network from a respective source node to a respective target node, wherein not all packets are transmitted to the same respective target node, wherein at least some of said packets must traverse one or more respective intermediate nodes between the respective said source node and the respective said target node; and routing each said packet on said regular lattice network according to its respective optimum path as determined by said concurrently analyzing step.

2. The method for inter-nodal packet routing of claim 1, wherein said network usage data comprises respective data representing current utilization of each of a plurality of said node-to-node communications links of said network.

3. The method for inter-nodal packet routing of claim 2, wherein said network usage data comprises a respective N-bit value corresponding to each of a plurality of said node-to-node communications links of said network.

4. The method for inter-nodal packet routing of claim 2, wherein said step of concurrently analyzing most recently obtained said composite network usage data to identify a respective optimum path for each of a respective plurality of packets within the corresponding node comprises summing a respective set of values, each value corresponding to a respective node-to-node communication link, for each of a plurality of potential paths, and comparing the sums.

5. The method for inter-nodal packet routing of claim 1, wherein said network usage data comprises respective data representing a number of packets currently waiting to be sent in each of said second plurality of nodes.

6. The method for inter-nodal packet routing of claim 1, wherein said step of concurrently analyzing most recently obtained said composite network usage data to identify a respective optimum path for each of a respective plurality of packets within the corresponding node comprises concurrently analyzing most recently obtained said composite network usage data to identify a respective optimum path for each of a plurality of messages, each message containing one or more said packets, wherein each packet within a message is assigned the respective optimum path identified for the message in which it is contained.

7. The method for inter-nodal packet routing of claim 1, wherein said step of concurrently analyzing most recently obtained said composite network usage data to identify a respective optimum path for each of a respective plurality of packets within the corresponding node is performed in a respective source node of each said packet; and wherein said step of routing each said packet on said network according to its respective optimum path comprises transmitting optimum path data as determined by the respective source node with each said packet, each intermediate node routing said packet according to said optimum path data as determined by the respective source node.

8. The method for inter-nodal packet routing of claim 1, wherein said optimum path is constrained to follow a minimal number of links of said network.

9. The method for inter-nodal packet routing of claim 1, wherein said step of periodically obtaining respective local network usage data from each node of a second plurality of nodes of said parallel computer system comprises periodically obtaining said respective local network usage data from each node of said second plurality of nodes of said parallel computer system using a second communications network of said parallel computer system, said second network being separate from said regular lattice network of node-to-node communication links.

10. A parallel computer system, comprising:
a plurality of nodes, each node having at least one processor and a memory accessible by the at least one processor;
a plurality of node-to-node communication links forming a process network arranged in a regular lattice for inter-nodal communications of application data generated in the course of executing applications on said plurality of nodes, each said application executing in parallel on a respective set of nodes of said plurality of nodes by executing a respective application sub-process of the respective application in the at least one respective processor of each node of the respective set of nodes of said plurality of nodes, wherein each respective application sub-process of at least some of said application sub-processes generates respective data for transmission, in one or more respective packets using said regular lattice network, to respective one or more other said application sub-processes of the respective application containing the respective sub-process;
a network monitoring mechanism which periodically generates network usage data with respect to usage of said process network, said network usage data comprising respective data representing current utilization of each of a plurality of components of said process network by current network traffic, said network monitoring mechanism providing said network usage data to each node of said plurality of nodes;
a respective routing mechanism in each node of said plurality of nodes for routing packets along said process network, each said routing mechanism analyzing said network usage data generated by said network monitoring mechanism to identify a respective optimum path for each of a respective plurality of packets within the corresponding node, each said packet being transmitted from a respective source node to a respective target node, wherein not all packets are transmitted to the same respective target node, wherein at least some of said packets must traverse one or more respective intermediate nodes between the respective said source node and the respective said target node, each said packet being routed along said process network according to its respective optimum path as determined by said routing mechanism.

11. The parallel computer system of claim 10, wherein said plurality of nodes are arranged in a logical N-dimensional lattice, each said communication link of said process network coupling a respective first node with a respective second node, the respective first and second nodes having identical coordinates in all except a respective Mth of the N dimensions of said N-dimensional lattice, the respective first and second nodes being logical neighbors in the respective Mth coordinate dimension.

12. The parallel computer system of claim 10, further comprising:
a collective network, separate from said process network, for transmitting said network usage data generated by said monitoring mechanism to said plurality of nodes.

13. The parallel computer system of claim 12, wherein said collective network is configured as a binary tree.

14. The parallel computer system of claim 12, wherein said monitoring mechanism periodically obtains respective local usage data from each node of a plurality of nodes of said parallel computer system using said collective network, and combines said respective local usage data from each node to obtain said network usage data with respect to usage of said process network.

15. A computer-implemented method for inter-nodal packet routing in a parallel computer system, said parallel computer system comprising a plurality of nodes arranged in a regular lattice network of node-to-node communications links for inter-nodal communications, each node comprising at least one processor and a nodal memory, said method comprising the steps of:
executing an application in parallel on a first plurality of nodes of said parallel computer system, each node of said first plurality of nodes executing a respective application sub-process of said application in the respective at least one processor of the respective node, wherein each of at least some of said application sub-processes generates respective data for transmission, in one or more respective packets using said regular lattice network, to respective one or more other said application sub-processes each executing in a respective node of said first plurality of nodes of said parallel computer system;
periodically obtaining respective local network usage data from each node of a second plurality of nodes of said parallel computer system, said second plurality of nodes including at least some nodes of said first plurality of nodes;
combining said respective local network usage data from each node in a usage data collector to form global network usage data with respect to usage of said regular lattice network, said global network usage data comprising respective data representing current utilization of each of a plurality of components of said regular lattice network by current network traffic;

transmitting said global network usage data from said usage data collector to each of said second plurality of said nodes;

concurrently analyzing most recently received said global network usage data in each of said second plurality of said nodes to identify a respective optimum path for each of a respective plurality of said packets in the corresponding node, each said packet being transmitted from a respective source node of said network to a respective target node of said regular lattice network, wherein not all packets are transmitted to the same respective target node, wherein at least some of said packets must traverse one or more respective intermediate nodes of said regular lattice network between the respective said source node and the respective said target node; and routing each said packet according to its respective optimum path as determined by said concurrently analyzing step.

16. The method for inter-nodal packet routing of claim 15, wherein said step of concurrently analyzing most recently received said global network usage data in each of said second plurality of said nodes to identify a respective optimum path for each of a respective plurality of packets in the corresponding node is performed in a respective source node of each said packet; and wherein said step of routing each said packet according to its respective optimum path comprises transmitting optimum path data as determined by the respective source node with each said packet, each intermediate node routing said packet according to said optimum path data as determined by the respective source node.

17. The method for inter-nodal packet routing of claim 9, wherein said second communications network is configured as a binary tree comprising said second plurality of nodes, es a binary tree network plurality of nodes comprises substantially all said plurality of nodes arranged in said regular lattice network.

18. The method for inter-nodal packet routing of claim 17, wherein said step of periodically obtaining respective local usage data from each node of a second plurality of nodes of said parallel computer system comprises receiving, in each of a plurality of said second plurality of nodes, a respective bit vector from each child node of the respective receiving node, each bit vector representing local network usage data of the respective child node and all children of the respective child node, combining the respective bit vector from each child node of the respective receiving node with a bit vector representing local network usage data of the respective receiving node to generate a bit vector representing local network usage data of the respective receiving node and all children of the respective receiving node, and forwarding the bit vector representing local network usage data of the respective receiving node and all children of the respective receiving node to a respective parent node of the respective receiving node.

19. A program product for inter-nodal packet routing in a parallel computer system, said parallel computer system comprising a plurality of nodes arranged in a regular lattice network of node-to-node communications links for inter-nodal communications of application data generated in the course of executing applications on said plurality of nodes, each node comprising at least one processor and a nodal memory, each said application executing in parallel on a respective set of nodes of said plurality of nodes by executing a respective application sub-process of the respective application in the at least one respective processor of each node of the respective set of nodes of said plurality of nodes, said first regular lattice network supporting inter-nodal communication of application data generated by executing application sub-processes in a plurality of packets, each packet conveying respective data generated by a respective application sub-process of a respective application to a different respective application sub-process of the respective application, the program product comprising:

a non-transitory computer readable storage medium;

a plurality of computer executable instructions recorded on the non-transitory computer readable storage medium, wherein said instructions, when executed by at least one node of said computer system, cause the at least one node to perform the steps of:

analyzing most recently obtained composite network usage data with respect to usage of said first regular lattice network of node-to-node communications links to identify a respective optimum path in said regular lattice network for each of a plurality of packets, said composite network usage data being formed from respective local usage data representing current utilization of one or more components in each of a plurality of nodes of said regular lattice network by current network traffic, said respective local usage data being periodically obtained from each node of the plurality of nodes of said parallel computer system using a second communications network of said parallel computer system, said composite network usage data being provided, using said second communications network, to each node of the plurality of nodes of said parallel computer system for routing respective pluralities of said packets from the respective node, said second communications network being separate from said regular lattice network of node-to-node communications links, each said packet being transmitted on said regular lattice network from a respective source node to a respective target node, wherein not all packets are transmitted to the same respective target node, wherein at least some of said packets must traverse one or more respective intermediate nodes between the respective said source node and the respective said target node; and causing each said packet to be routed on said regular lattice network according to its respective optimum path as determined by said analyzing step.

20. The program product of claim 19, wherein said step of analyzing most recently obtained composite network usage data to identify a respective optimum path in said regular lattice network for each of a plurality of packets is performed in a respective source node of each said packet; and wherein optimum path data as determined by the respective source node is transmitted with each said packet, each intermediate node routing said packet according to said optimum path data as determined by the respective source node.

21. The program product of claim 19, wherein said network usage data comprises respective data representing current utilization of each of a plurality of said node-to-node communications links of said regular lattice network.

22. The program product of claim 21, wherein said network usage data comprises a respective N-bit value corresponding to each of a plurality of said node-to-node communications links of said regular lattice network.

23. The program product of claim 19, wherein said network usage data comprises respective data representing a number of packets currently waiting to be sent in each of a plurality of sending nodes.

* * * * *